Jan. 14, 1969 G. R. PULLIAM 3,421,933

SPINEL FERRITE EPITAXIAL COMPOSITE

Original Filed March 4, 1963 Sheet 1 of 4

INVENTOR.
GEORGE R. PULLIAM

BY

Howard A. Silber

ATTORNEY

| SPINEL | BROMIDE AMOUNTS | TEMP. | TIME | HELIUM / AIR RATIO |
|---|---|---|---|---|
| $Fe_3O_4$ | 3g $Fr_2$ | 720°C | 30 MIN. | 600 : 1 |
| $NiFe_2O_4$ | 3g $FeBr_2$ – 1.5g $NiBr_2$ | 720°C | 45 MIN. | 50 : 1 |
| $CoFe_2O_4$ | 3g $FeBr_2$ – 1g · $CoBr_2$ | 720 C | 30 MIN. | 100 : 1 |
| $MnFe_2O_4$ | 3g $FeBr_2$ – 1.5g $MnBr_2$ | 680°C | 60 MIN | 500 : 1 |

*INVENTOR.*
GEORGE R. PULLIAM
*BY*
Howard A. Silber
ATTORNEY

INVENTOR.
GEORGE R. PULLIAM

BY

Howard A. Silber

ATTORNEY

INVENTOR.
GEORGE R. PULLIAM
BY
Howard A. Silber
ATTORNEY 3,421,933
Patented Jan. 14, 1969

3,421,933

SPINEL FERRITE EPITAXIAL COMPOSITE

George R. Pulliam, La Mirada, Calif., assignor to North American Rockwell Corporation, a corporation of Delaware Original application Mar. 4, 1963, Ser. No. 262,742. Divided and this application Dec. 14, 1966, Ser. No. 623,781
U.S. Cl. 117—121 3 Claims
Int. Cl. H01f *10/04*

ABSTRACT OF THE DISCLOSURE

An epitaxial composite comprising a substrate of magnesium oxide and a thin film of monocrystalline magnetic spinel ferrite epitaxially disposed on the substrate. The composite is useful as a magnetic memory, for example, by providing crossing electrical conductors adjacent elements of the epitaxial ferrite.

This is a division of application Ser. No. 262,742, filed Mar. 4, 1963, now abandoned in favor of continuation application, Ser. No. 631,104, filed Apr. 14, 1967.

This invention relates to magnetic materials; and more particularly to the crystalline structure of a magnetic material.

Magnetic materials are finding increasingly wider usage in the field of electronics, where they form the basis of various components such as transformers, inductances, magnetic tapes, memory devices for computers, and the like. Since these different components generally require different magnetic characteristics, a great deal of research has been undertaken to provide magnetic materials having suitable magnetic characteristics. One result of this research is the development of a class of magnetic materials known as "ferrites"; the various members of this class having various magnetic characteristics and crystalline arrangements.

In the field of magnetic memory devices for computers, it is a basic requirement that the magentic material should be magnetizable in one given direction, or in the opposite direction, in order to represent discrete "on" and "off" states; any other direction, or state, being undesirable. Moreover, a minimal-strength energizing-magnetic field should cause the magnetic material to switch from one state to the other.

It has been found that both the magnetic material and its physical configuration are factors in the operation of the memory device.

In the past, two principal approaches have been used to form the magnetic material into the optimum physical configuration. One approach used extremely small groups of crystals, either deposited on a suitable substrate, or held together by a suitable binder; thus forming a "poly-crystalline" arrangement. Of course, in this poly-crystalline arrangement the axes of the individual crystals are oriented in radom directions.

A second, "mono-crystalline" approach, was to grow a large crystal—which may be visualized, for convenience, as a plurality of individual crystals merged together in such a way that their axes are alined; thus forming a single large crystal. This large crystal was then sliced, ground, cut, or shaped into the desired shape and size.

It is known that in magnetic materials there are certain "magnetic" directions relative to the axis of the crystal, in which the material may be magnetized easily; and that there are other directions relative to the axis of the crystal in which it is more difficult to magnetize the material.

In the poly-crystalline arrangement produced by the first approach, the axes of the individual crystals were randomly oriented; and this random orientation of the axes of the individual crystals placed the magnetic directions of the individual crystals in random orientation. This condition does not provide optimum magnetic operation, because an energizing magnetizing field finds some of the axes at the easy-to-magnetize direction, finds others are at the hard-to-magnetize direction, and finds still others at intermediate directions. This means that various portions of the magnetic material respond in different ways to an energizing field.

The mono-crystalline configuration of the second approach does not have the above disadvantage; because there the axes of all the "individual" crystals are alined in the same direction as a result of the crystal-growing process. Thus, all portions of the single large crystal respond identically to an energizing magnetizing field.

Moreover, when using the mono-crystalline configuration, the subsequent shaping process may be controlled to take advantage of the easy-to-magnetize direction. For example, the large crystal may be cut, sliced, or ground in such a way that the easy-to-magnetize direction has a desired orientation relative to the energizing magnetizing field.

It is another characteristic of magnetic materials that in an extremely thin stratum, the direction of the "magnetic moment" (which is a function of electron spin, and need not be further discussed here) tends to remain in the plane of the stratum and does not point outward; that is, the film tends to become magnetically polarized in the plane of the stratum and not in the thin direction of the stratum.

For this reason, manufacturers try to produce a thin-film poly-crystalline arrangement, one example being the well-known magnetic tape; although as indicated above, the poly-crystalline arrangement has the inherent disadvantage that the individual crystals are randomly oriented.

On the other hand, while the mono-crystalilne arrangement has the inherent advantage of a "single" axis, difficulty is experienced in producing an extremely thin slice.

Ideally, if a large single crystal can be grown and sliced so that the resultant thin stratum has its easy-to-magnetize direction in the plane of the stratum; and moreover if this stratum is of a desired size and/or shape, this thin-stratum arrangement approaches the ideal magnetic structure for a memory device.

It is therefore the principal object of my invention to provide an improved magnetic material, and a method for producing said magnetic material.

The attainment of this object and others will be realized from the following specification, taken in conjunction with the drawings, of which FIG. 1 shows the directions of magnetization in a thin slab of magnetic material;

Broadly stated, my invention comprises the concept of producing a thin film of magnetic material in the form of a single-crystal. This is achieved by forming a single crystal of magnetic material on a substrate, the substrate and the magnetic material having crystalline arrangements that are conducive to an "epitaxial" relation that produces the above result.

The desired, ideal, thin-film magnetic structure can be achieved by following the teachings of my inventive concept.

Figure 1:
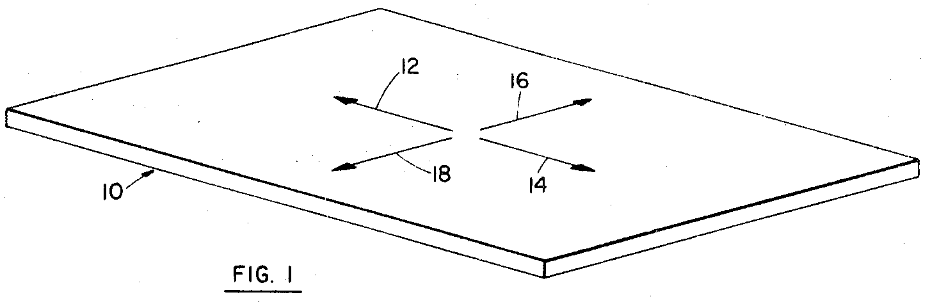

FIG. 1 depicts a thin slab 10 of magnetic material. Since in a thin slab the magnetic moments are in the plane of the slab, as previously indicated, the magnetic moments of slab 10 can be oriented in a longitudinal manner as shown by arrows 12 and 13; or in a transverse manner as shown by arrows 16 and 18; and in each manner the magnetic moment may point in either of the two opposite directions to represent "on" and "off" states.

If, for example, the longitudinal direction were the easy-to-magnetize direction, this would mean that the magnetic moments would easily assume the directions shown by the longitudinal arrows 12 and 14, i.e., a minimal-strength energizing magnetizing field could orient the magnetic moments in the direction of arrow 12 or 14. Reversing the energizing magnetic field would re-orient the magnetic moments to assume the opposite direction.

On the other hand, the magnetic moments would assume the directions shown by transverse arrows 16 and 18 only with a greater difficulty; i.e., this would require a much stronger energizing magnetic field. In other words, a minimal-strength energizing magnetic field would not orient the magnetic moments in the transverse directions 16, 18.

Hence, in thin slab 10, a minimal-strength energizing magnetic field, requiring a minimal amount of external power, would assure that the magnetic material would have only two oppositely-directed magnetic states.

It will therefore be realized if the thin slab of magnetic material as shown in FIG. 1 were a single crystal, it would have a number of extremely desirable characteristics. Firstly, it would be easily magnetized either in direction 12 or direction 14; secondly; this magnetization would be achieved with a minimum amount of energy; thirdly, all portions of the slab would respond in an identical manner; fourthly, the material would not become magnetized in the transverse direction; and finally, since there would be only two directions of magnetization, the direction of magnetization at any given instant would be easily detected by a relatively simple sensing device.

One of the most useful magnetic materials is the compound $Fe_3O_4$, which is a member of the class designated as ferrites. Moreover, it has a "spinel" type crystalline structure, and is therefore known as a "spinel ferrite"; the term spinel designating a type of crystalline structure first found in the mineral known as spinel.

In order to achieve my inventive concept, I produce a single large crystal of magnetic spinel ferrite, $Fe_3O_4$, in the form of a thin film, on a substrate of magnesium oxide, MgO.

Magnesium oxide makes an extremely good substrate, since it is non-magnetic; and therefore does not add to, or detract from the operation of the magnetic material. Moreover, a crystal of magnesium oxide has a desirable crystalline structure, which may be understood from FIG. 2.

Figure 2:
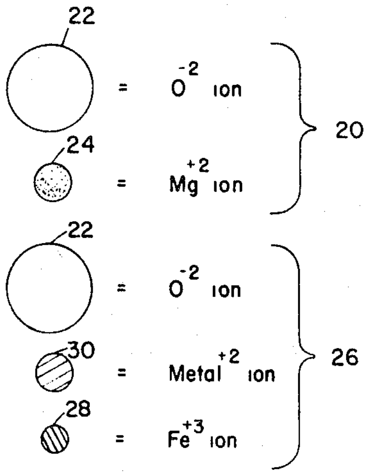
FIG. 2 shows, symbolically, the crystalline structure of magnesium oxide.
Figure 2:
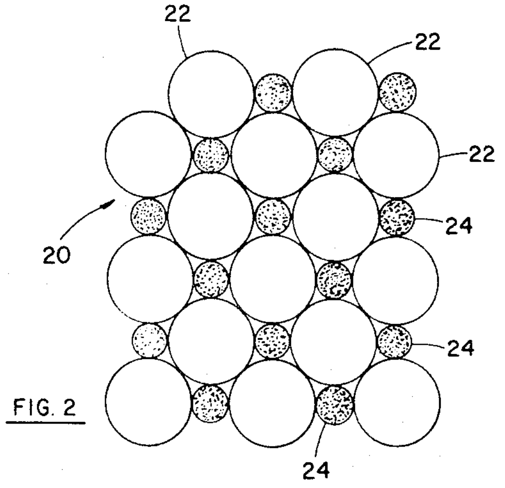

FIG. 2 depicts a crystal 20 of magnesium oxide, MgO; the large circles 22 representing the positions of the oxygen ions, while the small circles 24 represent the positions of the magnesium ions.

Figure 3:
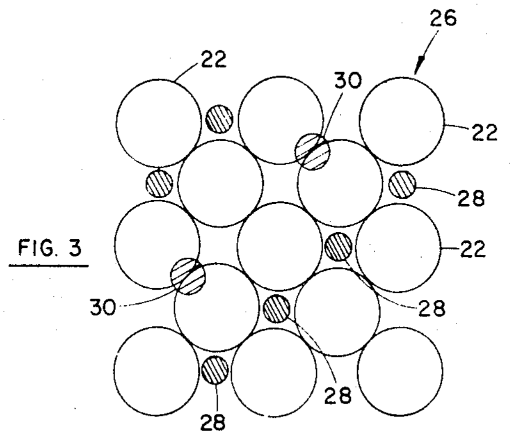
FIG. 3 shows, symbolically, the crystalline structure of a magnetic ferrite having a "spinel" crystalline arrangement.

FIG. 3 depicts a crystal 26 of a spinel, $Fe_3O_4$ in this case; the large circles 22 again representing the positions of the oxygen ions; the smallest circles 28 representing the positions of iron ions; and the medium-sized circles 30 representing the positions of metallic ions, whose influence will be discussed later.

The similarity between the positions of the oxygen ions (large circles 20) in FIGS. 2 and 3 will be readily apparent.

Figure 4:
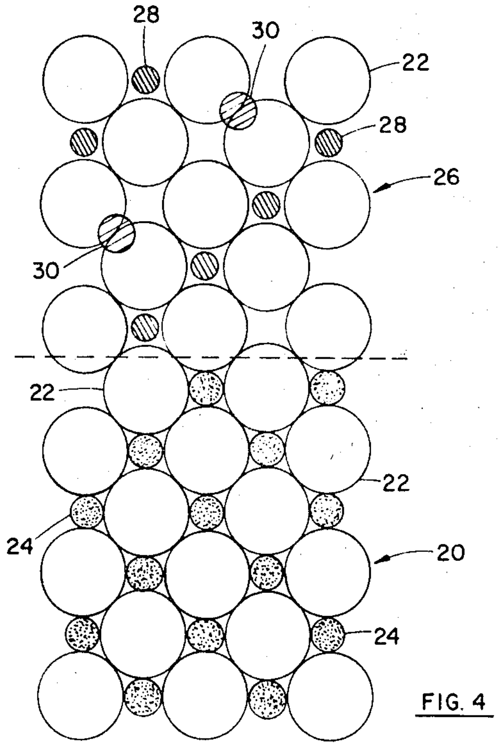
FIG. 4 shows, symbolically, the crystalline structure of a magnetic spinel ferrite combined with a magnesium-oxide substrate.

My basic inventive concept is to deposit a crystal of a spinel ferrite, such as $Fe_3O_4$, exemplified by crystal 26 of FIG. 3, onto a magnesium oxide crystal 20 as shown in FIG. 2; the combination then appearing as shown in FIG. 4.

The similarity in configuration and size of the spinel ferrite crystal 26 and the magnesium oxide crystal 20 is such that the oxygen ions are located at identical positions in both crystals. Thus, when an individual crystal 26 of the ferrite spinel is deposited onto an individual crystal 20 of magnesium oxide, the oxygen ions of the deposited ferrite spinel appear as a continuation of the magnesium oxide structure. Only the positions of the metallic ions of the spinel are different from the positions of the magnesium ions of the substrate. Therefore, the upper, deposited, ferrite spinel crystal 26 is oriented in such a manner that its axes have a given orientation relative to the axes of the lower magnesium oxide crystal 20.

If a magnesium oxide crystal of twice the size were used as a substrate, then two crystals of the spinel ferrite could be deposited onto this substrate; and the two deposited crystals would merge to form a larger, single crystal whose axes would be oriented in the same direction as the axes of the original single crystal previously described.

Similarly, if the magnesium oxide substrate were three or four times the size of the previously described example, the deposited spinel ferrite would form a triple or quadruple-sized crystal whose axes would be in the same direction as in the previous cases.

This regular reptitious orientation of axes in a given direction relative to a substrate is known as an "epitaxial" relation; and in the above case is due to the similarity between the size and crystalline structures of the substrate and the deposited material.

If, now a large magnesium oxide crystal were ground and etched to form a smooth-surfaced substrate, a large single spinel ferrite crystal could be formed thereon, with the axes of the magnetic material in a given orientation, as determined by the substrate. Thus, the resultant ferrite would be a single crystal as large as the basic magnesium oxide crystal, and could be as thick or as thin as desired. In this way an epitaxial film of magnetic ferric oxide of desired thickness may be produced on a magnesium oxide substrate.

In accordance with my invention, the magnesium oxide substrate comprises a large crystal, which is readily available commercially. Onto this substrate I deposit, by means to be specifically described later, a ferrite crystal. In this way, the deposited ferrite crystal is epitaxial to the substrate; the ferrite crystal can be as thick or as thin as desired; and can be as large as the magnesium oxide substrate.

By making the deposited ferrite only a few microns thick, it is formed into a thin film of magnetic material that has the desirable magnetic characteristics discussed above.

The invention thus comprises the combination of a substrate, specifically MgO, and a crystal of magnetic material positioned on said substrate in an epitaxial relation therewith.

THE INVENTIVE PROCESS

The processes defined by the following chemical equations are such that stoichiometric quantities of the given compounds react in accordance with the prevailing temperatures, pressures, vapor pressures, concentrations, and other factors.

A two-step chemical reaction may be used. In step one, ferrous oxide (FeO) is deposited onto a magnesium oxide substrate, as exemplified by Equation I–1 shown below.

$$FeBr_2 + H_2O \rightarrow FeO + 2HBr\uparrow \qquad (I\text{–}1)$$

This may be done by heating ferric bromide in a chamber to form a ferric bromide atmosphere; suspending the magnesium-oxide crystal in this atmosphere; and introducing moisture. The moisture ($H_2O$) is mostly conveniently introduced by a stream of humid air, or by a moist inert gas such as helium. The use of an inert gas minimizes the possibility of reversing the process of Equation I–1.

I have found that maintaining the bromide vapor and the magnesium oxide crystal at a temperature in the range of 500° C. to 800° C. is satisfactory; although at 700° C. the vapor pressure of ferric bromide provides a desirable ratio of ferric bromide to air or helium.

If desired, hydrogen and oxygen may be used instead of the air and moisture, since in the process of Equation I–1 the moisture breaks down into hydrogen and oxygen.

In the second step of the two-step chemical reaction, the ferrous oxide (FeO) is oxidized to form ferrous-ferric oxide ($Fe_3O_4$) by the introduction of oxygen or carbon dioxide into the chamber; these chemical reactions being exemplified by Equations I–2.1 and I–2.2.

$$3FeO + \tfrac{1}{2}O_2 \rightarrow Fe_3O_4 \qquad (I\text{–}2.1)$$

$$3FeO + CO_2 \rightarrow Fe_3O_4 + CO \qquad (I\text{–}2.2)$$

Thus, the desired $Fe_3O_4$ is produced on the MgO substrate.

Rather than using the above-described two-step chemical reaction, a one-step chemical reaction may alternatively be used; and $Fe_3O_4$ may be formed directly by use of a reaction exemplified in Equation II–1.

$$3FeBr_2 + \tfrac{1}{2}O_2 + 3H_2O \rightarrow Fe_3O_4 + 6HBr \qquad (II\text{–}1)$$

Regardless of whether the one-step or the two-step chemical reaction is used, the final result is a thin layer of magnetic material, $Fe_3O_4$, on a substrate of non-magnetic material, magnesium oxide; the magnetic material being an epitaxial thin film of desired thickness.

It was previously indicated that $Fe_3O_4$ has a spinel crystalline structure. The general formula for a spinel ferrite may be written as $(A,B)^{+2}(C,D)_2{}^{+3}O_4$; wherein the first parenthesis comprises divalent ions (indicated by the "+2") of additives such as Fe, Mg, Mn, Co, Ni, Zn, Cu, or combinations of these additives—and the second parenthesis comprises trivalent ions (indicated by the "+3") of additives such as Fe, Mn, Co, Ni, or combinations of these additives.

Thus, desirable magnetic spinels may take such forms as $Fe_3O_4$; $NiFe_2O_4$; $CoFe_2O_4$; $MnFe_2O_4$; (Mg, Mn) (Fe, $Mn)_2O_4$; etc.

These may be produced in the above-described one-step chemical reaction by additionally vaporizing suitable bromides, the reactions being exemplified by the following equations.

$$FeBr_2 + NiBr_2 + O_2 + H_2O \rightarrow NiFe_2O_4 + HBr \qquad (II\text{–}2)$$

$$FeBr_2 + CoBr_2 + O_2 + H_2O \rightarrow CoFe_2O_4 + HBr \qquad (II\text{–}3)$$

$$FeBr_2 + MnBr_2 + O_2 + H_2O \rightarrow MnFe_2O_4 + HBr \qquad (II\text{–}4)$$

$$ZnBr_2 + MgBr_2 + MnBr_2 + FeBr_2 + O_2 + H_2O \rightarrow (Mg, Mn, Zn)\ (Fe, Mn)_2\ O_4 + HBr \qquad (II\text{–}5)$$

Figures 5, 6:
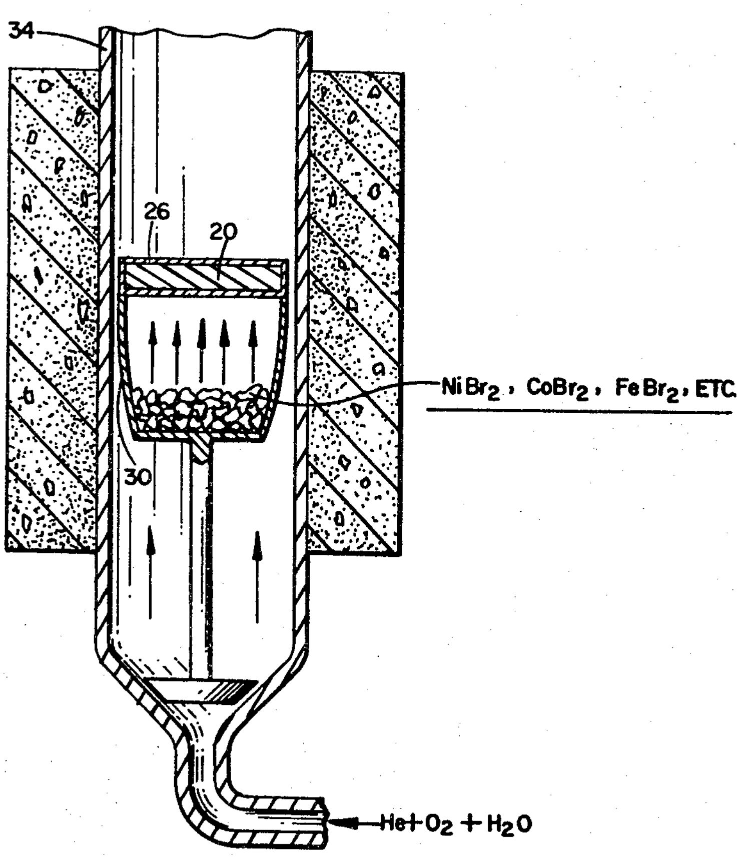
FIG. 5 shows exemplary apparatus.
FIG. 6 shows deposition conditions.

The apparatus of FIG. 5 may be used in depositing the spinels on the substrate crystal. The desired mixture by weight of dried bromides is placed in a quartz crucible 30 in roughly the ratio of the vapor pressures of the different species. The prepared substrate 20 is then placed directly over the crucible, and the assembly placed in a Vycor glass tube 34 through which the selected atmosphere flows. After a suitable purge period, the tube containing the specimen and the bromides is inserted into a split-tube furnace which has been preheated.

The conditions for deposition vary with the particular spinel 26 being deposited. The atmosphere flowing past the specimen is a mixture of helium, air, and water vapor; the amount of air added to the helium being in the order of 0.2 to 2.0 percent, while the water vapor pressure is held constant at 24 mm. of Hg correspoding to a dew point of 25° C. The amount of air added to the flow system is controlled by accurate low-range flow gauges, and the water vapor is controlled by passing the gas mixture through water maintained at 25° C. The range of temperatures used in the deposition is from 680° C. to 720° C. The specific conditions for the deposition of the different spinels is given in FIG. 6.

Alternatively, the additives may be introduced into the first-described two-step chemical reaction as follows:

Step 1

$$MnBr_2 + FeBr_2 + H_2O \rightarrow (Mn, Fe)O + HBr \qquad (I\text{–}1.1)$$

Step 2

$$(Mn, Fe)\ O + O_2 \rightarrow (Mn, Fe)_3O_4 \qquad (I\text{–}2.3)$$

It will be noted that many of the additives have both a divalent state and a trivalent state, and therefore the same additive may appear in the first (divalent) parenthesis, or in the second (trivalent) parenthesis; e.g., (Mg, Mn) (Fe, $Mn)_2O_4$. Their state, and therefore their position in the formula may be controlled by the amount of oxygen provided for the process. An excess of oxygen present during the process drives the additives toward their trivalent state, whereas a smaller amount of oxygen drives them toward their divalent state.

Figure 7:
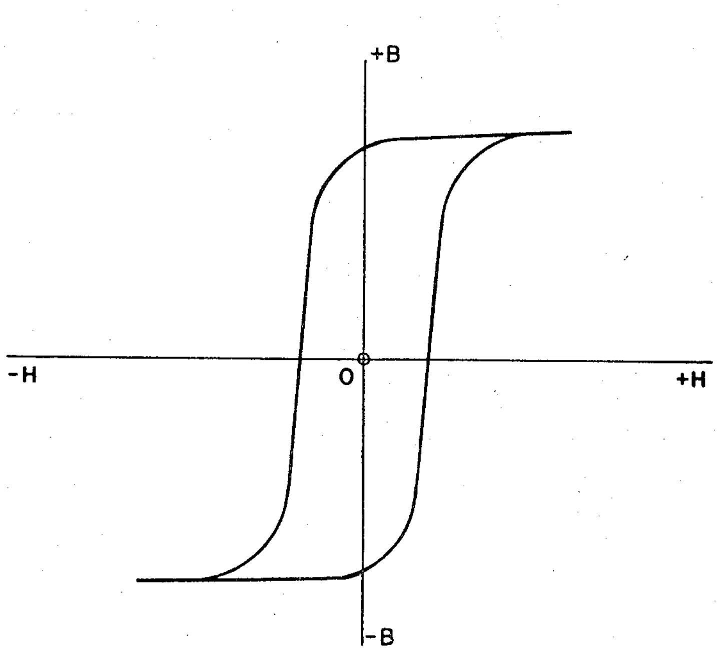
FIG. 7 shows a magnetic hysteresis loop.

Directing attention to FIG. 7, which shows a typical hysteresis loop, I have found that the remanence (vertical size of the hysteresis loop) may be increased by introducing Fe and Mn into the crystalline structure; whereas Ni, Zn, and Mg additives reduce the remanence.

High coercive-field materials (those whose hysteresis loops are wide) are produced by Co additives; whereas Mn in combination with Mg reduces the coercive field.

In this way, an epitaxial ferrite having suitable magnetic properties can be formed.

Magnetic analysis of ferrite films produced in the above manner indicate that the resultant materials may have coercive fields in the range of 2 to 100 oersteds, and remanences that range from 2000 to 4500 gauss.

Selective heat treatment can be used to control these properties. It appears that during the formation of the thin film, the ions (30 of FIGS. 3 and 4) of the various additives do not always settle in the most desirable positions of the crystal. By heating the resultant structure, the ions are enabled to migrate to other positions of the crystal. A quenching process "freezes" the ions in their instantaneous position, to provide more-desirable properties.

The heat-treating process may comprise heating the structure to a given temperature, and then cooling it either quickly or at a slow rate; this result being analogous to the case-hardening and annealing heat-treatment of steels. The temperature and the cooling rates vary with each compound, and the desired results.

The resultant thin epitaxial film of magnetic material can be used for memory systems in several ways. For example, a magnetic writing head may be passed over the surface of the magnetic film to induce desired magnetic orientations at specific areas of the film. Erasing is performed by reversing the energizing magnetic field; and readout is achieved in the usual well-known manner.

Figure 8:
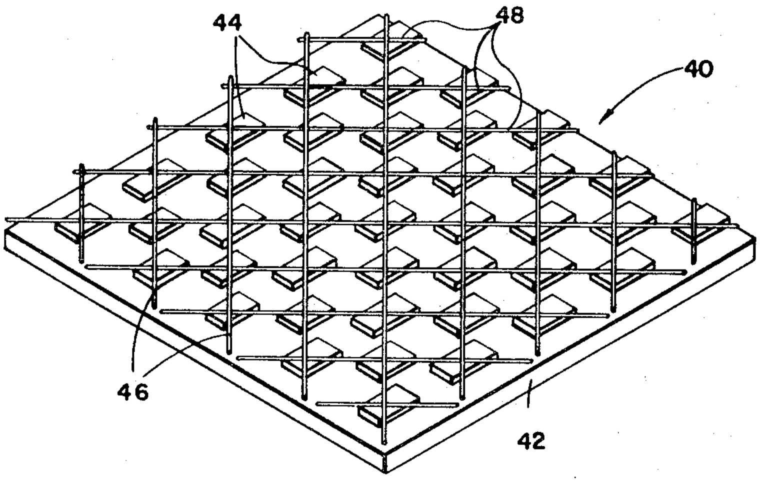
FIG. 8 shows a composite magnetic memory device prepared in accordance with my invention.

An alternative memory structure 40 is shown in FIG. 8. During the processing, the magnesium oxide substrate 42 is suitably masked by use of physical masks, or by configurations of materials such as magnesium phosphate formed on the magnesium oxide substrate, so that the deposited epitaxial magnetic film takes the form of a plurality of spaced memory elements 44. Thus, the composite element 40 comprises a non-magnetic substrate 42 of magnesium oxide, and a plurality of memory elements 44 of epitaxial magnetic material formed in the previously described manner. A grid of wires 46 and 48 criss-crosses the memory structure in such a way that wires cross in close proximity to each magnetic memory element.

Figure 9:
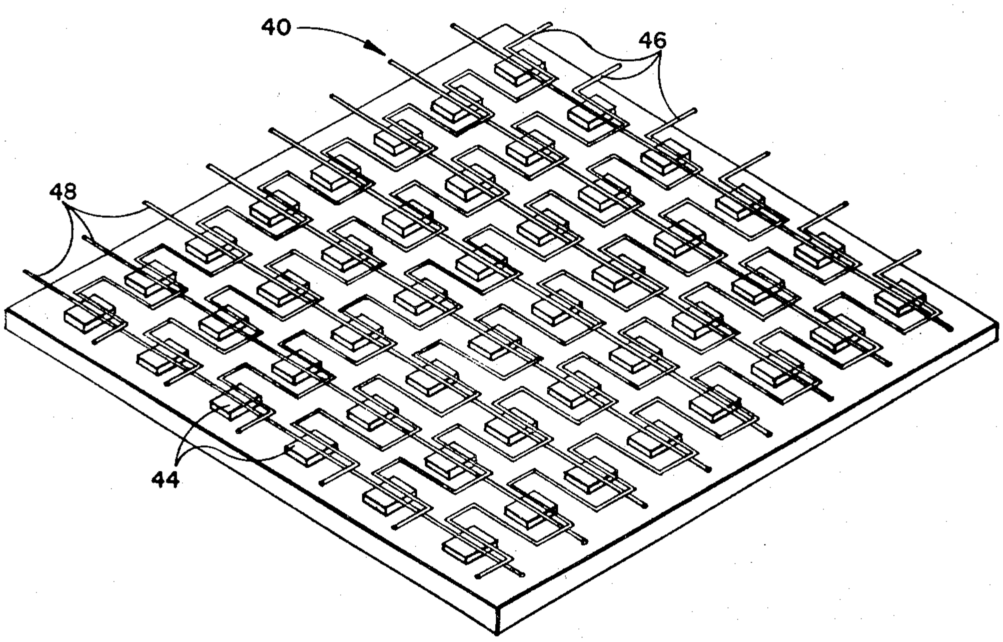
FIG. 9 shows an alternate orientation of current conductors in the memory device of FIG. 8.

When electric current is passed through selected wires, their magnetic fields are additive at their intersection, and thus induce magnetism of a particular orientation in the magnetic memory element beneath the intersection of the wires. In this way that particular memory element becomes magnetized in a particular orientation, while the other memory elements are not affected; each element acting as a single-crystal thin-film, to provide the desired magnetic characteristics previously discussed. It is also noted that wires 46 and 48 may nevertheless, at each memory element 44, be oriented to run parallel to each other as shown in FIG. 9 in order that the created magnetic fields are parallel.

Although the invention has been described and illustrated in detail, it is to be clearly understood that the same is by way of illustration and example only, and is not to be taken by way of limitation.

I claim:

1. An article comprising:

a substrate of single crystal magnesium oxide; and a single crystal magnetic spinel ferrite coating on said substrate in an epitaxial relation therewith.

2. The article of claim 1 wherein said coating is substantially co-extensive with said substrate.

3. The article defined in claim 1 wherein said magnetic spinel ferrite has the general formula $$(A,B)^{+2}(C,D)_2^{+3}O_4$$

wherein A and B each are divalent ions selected from the group consisting of Fe, Mg, Mn, Co, Ni, Zn, and Cu, and wherein C and D each are trivalent ions selected from the group consisting of Fe, Mn, Co and Ni.

References Cited

UNITED STATES PATENTS

| | | | |
|---|---|---|---|
| 2,842,468 | 7/1958 | Brenner | 148—1.6 |
| 2,848,310 | 8/1958 | Remeika | 23—305 |
| 2,919,207 | 12/1959 | Scholzel | 117—106 |
| 3,047,438 | 7/1962 | Marinace | 117—106 X |
| 3,094,395 | 6/1963 | Richardson | 23—294 |
| 3,102,099 | 8/1963 | Stuijts | 252—62.5 |
| 3,301,213 | 1/1967 | Grochowski et al. | 118—48 |
| 3,312,571 | 4/1967 | Ruehrwein | 148—175 |
| 3,332,796 | 7/1967 | Kooy | 117—21 |

OTHER REFERENCES

Cech et al., "Preparation of FeO, NiO, and CoO Crystals by Halide Decomposition," Trans. Am. Soc. Metals, vol. 51, pp. 150–161 (copy in Gr. 110, T.S. 300 A 512).

Collins et al., "Magnetic Behaviour of Thin Single-Crystal Nickel Films," Phil Mag., vol. 45, No. 362, pp. 283–9 (copy in Science Library, Q 1 p.5).

WILLIAM D. MARTIN, *Primary Examiner.*

B. PIANALTO, *Assistant Examiner.*

U.S. Cl. X.R.

117—62, 106